United States Patent
McDaniel

(10) Patent No.: US 9,424,378 B2
(45) Date of Patent: Aug. 23, 2016

(54) SIMULATION USING COUPLING CONSTRAINTS

(71) Applicant: Siemens Product Lifecycle Management Software Inc., Plano, TX (US)

(72) Inventor: Richard Gary McDaniel, Hightstown, NJ (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 177 days.

(21) Appl. No.: 14/170,753

(22) Filed: Feb. 3, 2014

(65) Prior Publication Data

US 2015/0220666 A1     Aug. 6, 2015

(51) Int. Cl.
  G06G 7/48     (2006.01)
  G06F 17/50    (2006.01)
(52) U.S. Cl.
  CPC ........ G06F 17/5009 (2013.01); G06F 17/5086 (2013.01); *Y02T 10/82* (2013.01)
(58) Field of Classification Search
  CPC ..................... G06F 17/5009; G06F 17/5086
  USPC ........................................................... 703/7
  See application file for complete search history.

(56) References Cited

U.S. PATENT DOCUMENTS

| 8,571,840 B2 | 10/2013 | Hudetz et al. |
| 9,259,289 B2 * | 2/2016 | Zhao ................. B25J 9/1697 |
| 2002/0123812 A1 * | 9/2002 | Jayaram et al. ............. 700/98 |
| 2002/0153419 A1 * | 10/2002 | Hall ...................... G05B 19/00 235/400 |
| 2004/0093119 A1 * | 5/2004 | Gunnarsson ........... B25J 9/1638 700/245 |
| 2006/0142657 A1 * | 6/2006 | Quaid ................ A61B 17/1764 600/424 |
| 2007/0260356 A1 * | 11/2007 | Kock .................... B25J 9/1641 700/261 |
| 2007/0287992 A1 * | 12/2007 | Diolaiti .............. A61B 19/2203 606/1 |
| 2011/0295563 A1 | 12/2011 | McDaniel |
| 2012/0078598 A1 * | 3/2012 | McDaniel .......................... 703/6 |

OTHER PUBLICATIONS

Sauer et al.("A Constraint-Based Approach to Rigid Body Dynamics for Virtual Reality Applications", ACM 1998, pp. 153-162).*
David Baraff ("Physically Based Modeling Rigid Body Simulation", Pixar Animation Studios,2001, pp. 1-69).*
Isaacs, et al., "Controlling Dynamic Simulation with Kinematic Constraints, Behavior Functions and Inverse Dynamics," Computer Graphics, vol. 21, No. 4, Jul. 1987, pp. 215-224.

(Continued)

*Primary Examiner* — Omar Fernandez Rivas
*Assistant Examiner* — Iftekhar Khan

(57) ABSTRACT

Methods for model simulation and corresponding systems and computer-readable mediums. A method includes receiving a simulation model in the data processing system, the simulation model including at least one master joint connected to at least one slave joint by a coupling, the master joint having a rigid body master attachment and the slave joint having a rigid body slave attachment. The method includes identifying a master axis of the master attachment and a slave axis of the slave attachment. The method includes making a motor determination as to whether the master axis or the slave axis has a motor and making a cross-base determination. The method includes making a constraint determination of which bodies to constrain based on the motor determination and the cross-base determination, storing constraints according to the constraint determination, and executing the simulation model according to the constraint determination.

17 Claims, 7 Drawing Sheets

(56) References Cited

OTHER PUBLICATIONS

PCT Search Report mailed Apr. 28, 2015, for Application No. PCT/US2015/013641, 9 pages.

Isaacs, Paul M. et al., "Controlling Dynamic Simulation with Kinematic Constraints, Behavior Function and Inverse Dynamics," ACM SIGGRAPH Computer Graphics, vol. 21, No. 4, pp. 215-224, Jul. 1987, 1 page.

Sauer, Jorg et al., "A Constraint-Based Approach to Rigid Body Dynamics for Virtual Reality Applications," In Proceedings of the ACM Symposium on Virtual Reality Software and Technology (VRST '98), pp. 153-162, Nov. 2-5, 1998, 9 pages.

* cited by examiner

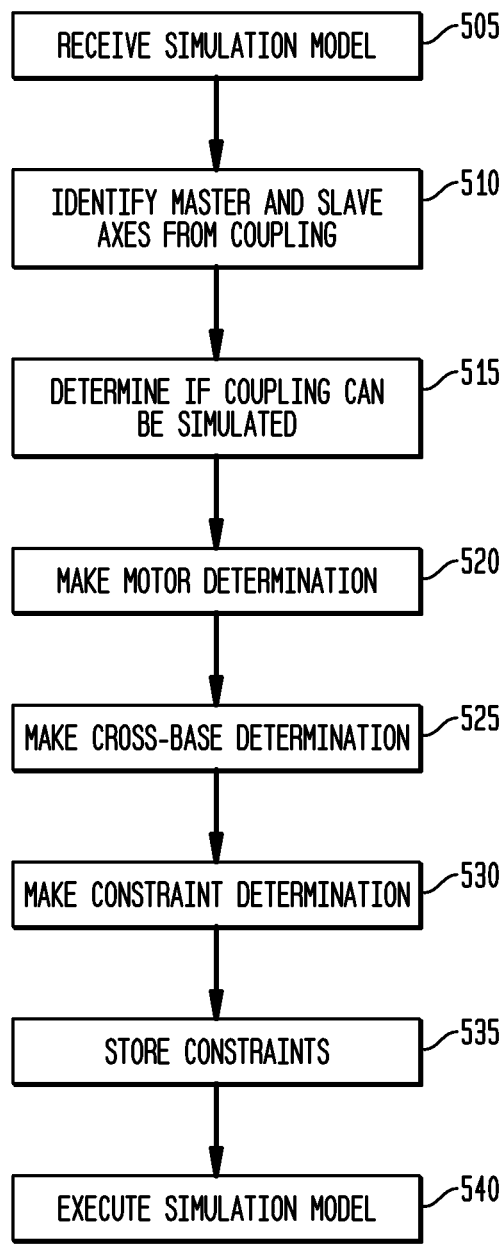

SIMULATION USING COUPLING CONSTRAINTS

TECHNICAL FIELD

The present disclosure is directed, in general, to computer-aided design, visualization, and manufacturing systems, product lifecycle management ("PLM") systems, and similar systems, that manage data for products and other items (collectively, "CAD systems").

BACKGROUND OF THE DISCLOSURE

CAD systems enable product visualization and simulation. Improved systems are desirable.

SUMMARY OF THE DISCLOSURE

Various disclosed embodiments include methods for model simulation and corresponding systems and computer-readable mediums. A method includes receiving a simulation model in the data processing system, the simulation model including at least one master joint connected to at least one slave joint by a coupling, the master joint having a rigid body master attachment and the slave joint having a rigid body slave attachment. The method includes identifying a master axis of the master attachment and a slave axis of the slave attachment based on the coupling. The method includes making a motor determination as to whether the master axis has a motor or whether the slave axis has a motor and making a cross-base determination corresponding to the master attachment and the slave attachment. The method includes making a constraint determination of which bodies to constrain based on the motor determination and the cross-base determination, storing constraints according to the constraint determination, and executing the simulation model according to the constraint determination.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 5 depicts a flowchart of a process in accordance with disclosed embodiments;

DETAILED DESCRIPTION

Figure 1:
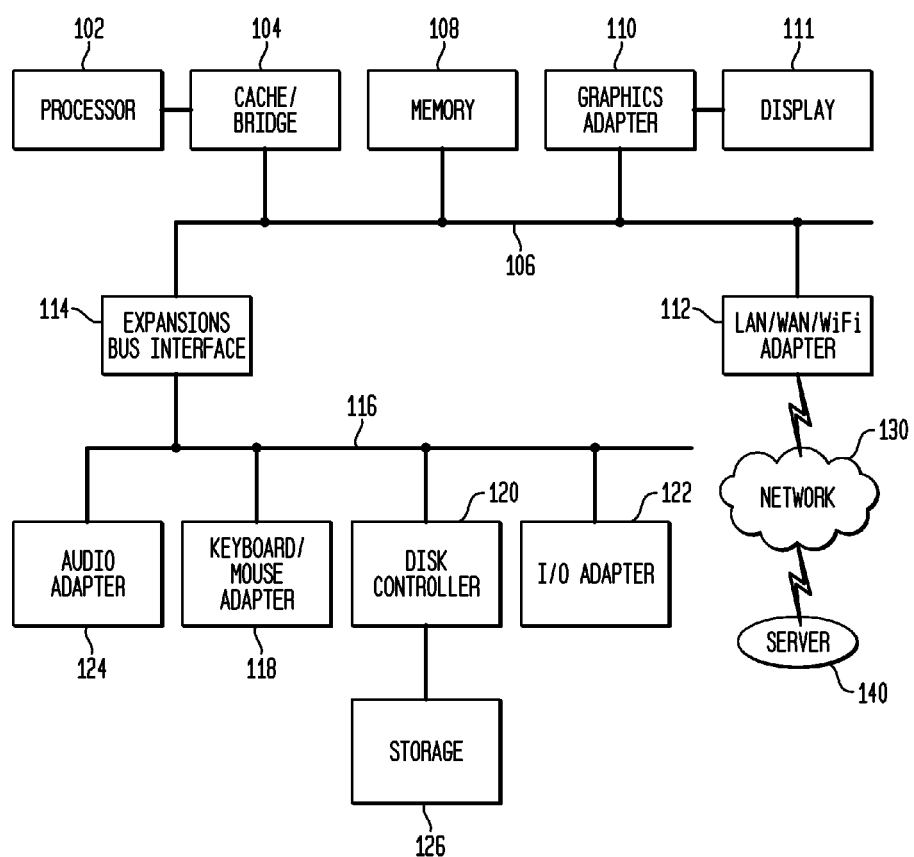
FIG. 1 depicts a block diagram of a data processing system in which an embodiment can be implemented.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Disclosed embodiments include systems and methods for accurately and efficiently simulating coupling constraints between moving parts, including permitting reflected motion and fixed axis control in gear and cam constraints.

Axes of motion are a critical aspect of industrial machines. These degrees of freedom determine how objects move with respect to one another when they are being operated upon. The relationships between axes of motion in the past were constructed using physical couplings such as gears or cams. Physical gears and cams are still in modern use as well as electrical equivalents that use software or other electronic influences to cause axes to move in purposeful relation to one another.

In simulation, machines can be represented by algorithmic and mathematical objects and solved to determine the expected motion of the various parts over time. In 3D rigid body simulation, moving physical elements are represented as rigid body objects and relationships between the objects constrain their simulated motion such they behave in way analogous to the way a physical device would work. Various constraints are used to represent different kinds of physical attachments such rotary hinge joints, linear sliding joints, ball joints, and others. These allow freedom of movement in key directions and limit movement in others. A rotary joint, for example, allows movement in a single circular direction between two rigid bodies but constrains all other movement such as side to side movement or rotation that tips away from the rotary axis.

There are a wide variety of simulation systems and means for representing simulations within these systems. The disclosure herein includes but is not limited to four kinds of simulation objects: rigid body, joint, coupling, and motor. The rigid body represents a moving entity in the simulation. It can have properties for position, orientation, velocity, mass, and other attributes.

A joint is defined as a connection between two rigid bodies that restrict their motion. A rotary joint restricts motion so that only rotation can occur between the two objects; a linear joint restricts motion so that only a linear dimension of motion can occur. For both a rotary and linear joint, a vector direction for the axis of motion is defined as well as a current position that provides a distance measure between the rigid bodies.

A coupling is defined as a relationship between two axis joints such that movement on both joints is controlled so that their positions are always related by some function. In a gear coupling, the positions are related as a ratio, for a cam coupling, the positions can be related by a continuous function.

Finally, a motor is used to generate movement on one or more rigid bodies. A motor is applied to a single axis joint and will impose torques on the associated bodies to create changes in velocity or position. Simulation systems can define other types of objects with different arrangements and properties as well and will possibly define these common objects in different ways. Disclosed techniques can also be applied to objects in these systems with analogous function to the objects described.

Disclosed embodiments include systems and methods that allow more accurate and stable solving of constrained axes in a rigid body simulation. In a gear or cam constraint, a functional relationship is made between two pairs of rigid bodies moving on a one dimensional axis. Since there are four bodies involved, adjustments can be used to solve the constraint using only two of the four bodies. Disclosed embodiments describe how the bodies can be selected and the relationship expressions that can be used to perform the simulation.

FIG. 1 depicts a block diagram of a data processing system in which an embodiment can be implemented, for example as a CAD system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, touchpad, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100. In the discussion below, the "system" refers to one or more data processing systems.

Figure 2:
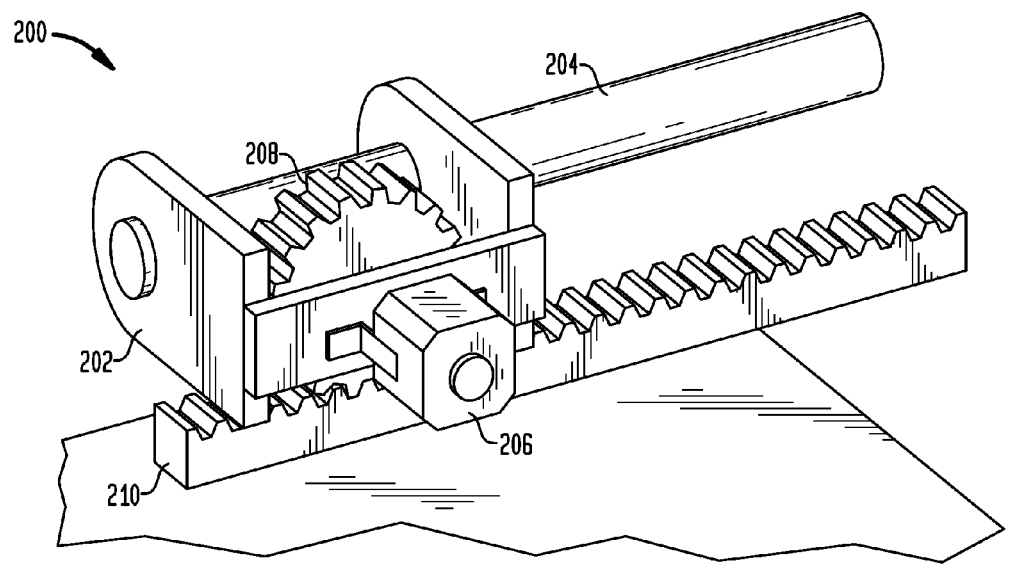
FIGS. 2 and 3 illustrate examples of coupling constraints in accordance with disclosed embodiments.

FIG. 2 illustrates an example of a coupling constraint and can be used as an example of how a simulation system as disclosed can be configured. The device 200 consists of a number of parts with a shuttling mechanism mounted on a bar 204. The shuttle and its housing 202 can move along the bar and is driven by a motor 206. The motor 206 is connected to a round sprocket 208 that is meshed with a bar gear 210. Rotating the sprocket 208 causes a mechanical force against the bar 210 that drives the device 200 shuttle assembly along the linear direction.

Figure 3:
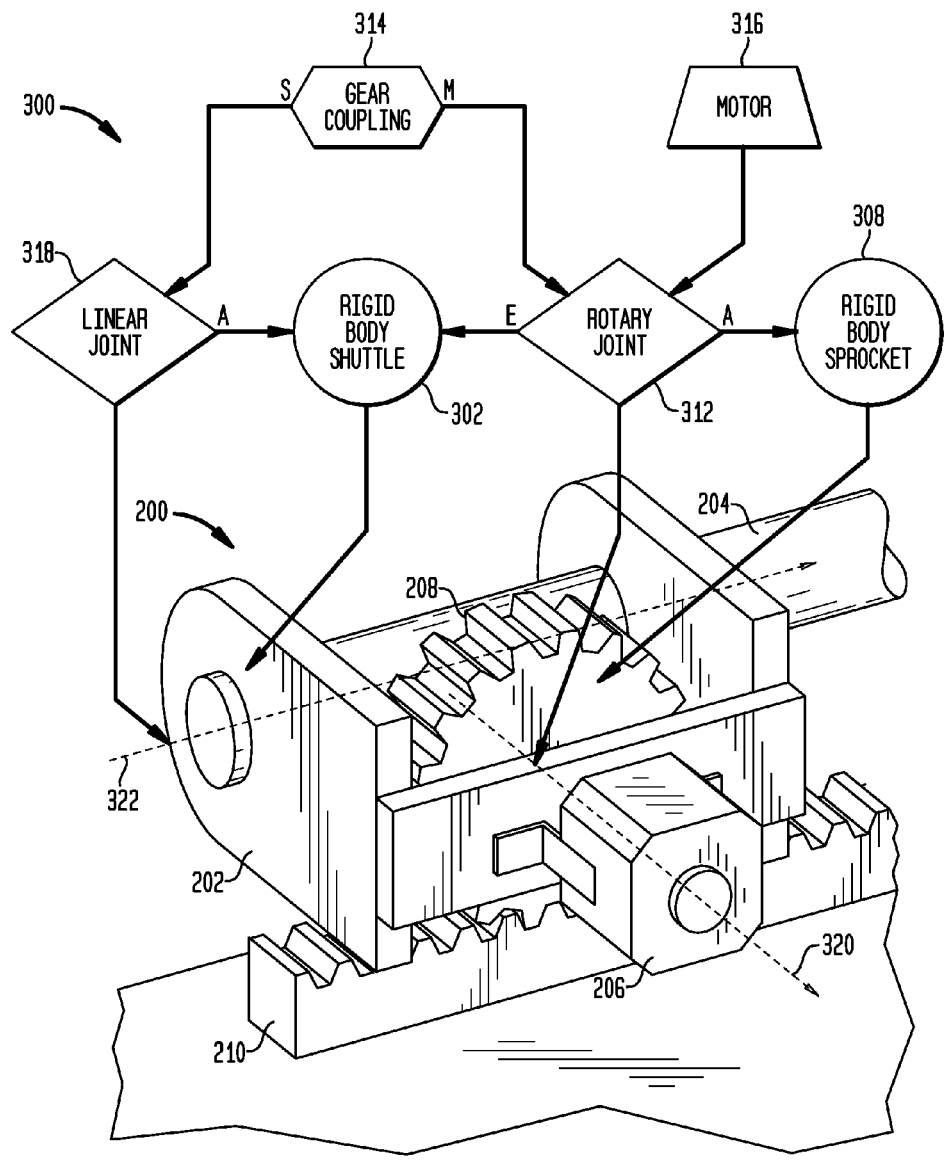

FIG. 3 illustrates an example of a simulation model 300 corresponding to the device 200, including simulated solid objects and corresponding logical entities such as bodies, couplings, joints, motors, etc. To create a simulation of this device, the objects in FIG. 3 can be defined by the system. Different shapes can be used to denote different simulation object types. In this example, circles are rigid bodies, diamonds are joints, hexagons are couplings, and trapezoids are motors. Since there are two moving objects in the example, there are two rigid body objects in the simulation: rigid body shuttle 302 for the shuttle housing 202 along with the attached motor 206, and rigid body sprocket 308 for the gear sprocket 208. The shuttle is held up by the bar in the actual device but since the bar does not move, it does not need to be modeled as a rigid body. Similarly, the bar gear does not need to be modeled with a rigid body. These objects can be considered part of the unmoving background.

The sideways linear movement of the shuttle 202 can be modeled with a linear joint. Joints are specified between a pair of rigid body objects that are called the attachment and the base. Each of the joint's body parameters may be set with a given rigid body object or may be left empty. The definition for the attachment and base objects need not be symmetrical. If the attachment parameter is left empty, the joint may be considered to be disconnected but its position will move if the base rigid body moves. If the base parameter is left empty, the joint may be considered to be attached to the background that acts as a kind of unseen body that does not move. In FIG. 3, the attachment parameter is marked with "A" and the base with "B". The base for linear joint is left empty that means that the shuttle is attached to the background. The shuttle will move back and forth along the linear axis of the joint and does not fall down.

The gear sprocket in the example is connected to the shuttle housing using a rotary joint 312. In this case, the sprocket and the housing are attached and move relative to one another. To model this, the attachment of the rotary joint is set to the rigid body sprocket 308 and the base is set to the rigid body shuttle 302.

The axes of motion for the example are shown as dotted lines 320 and 322 in FIG. 3; axis parameters can be stored in the joint objects or rigid body objects. Rotation of the sprocket will cause the shuttle to move on the bar, thus imposing a relationship between motions that occur on the axes. The relationship can operate in both directions; movement of the shuttle would also cause the sprocket to turn. To model this relationship, a coupling object is used, in this case, a gear coupling 314. A coupling pairs two axes: a master axis 320 (indicated as the master axis by the "master" M designation on coupling 314) and a slave axis 322 (indicated as the slave axis by the "slave" S designation on coupling 314). Similarly, the coupling object defines that rotary joint 312 is the master joint and that linear joint 318 is the slave joint. Since the coupling defines the master/slave joints and therefore the master/slave axes, the axes can be determined from the coupling. If the coupling does not already define the master/slave relationships, the system or a user can assign master/slave roles according to the function of the simulation object. A function is used to determine how movement in one axis will affect the motion on the other axis. The position of the master axis acts as the domain of the function and the slave axis position acts as the range. In this case, a gear coupling may be used where the function is specified as a ratio of the movements on each axis. A full turn of the sprocket, for example, might cause the shuttle to move in the linear direction a certain length, say 30 centimeters.

Rounding out the simulation, a motor object 316 is applied to the rotary joint 312. A motor may be added to any axis joint and could be used to change the speed or position of bodies connected to that joint. In this case, since the rotary joint is connected between the shuttle housing and the sprocket, the motor would modify the relative speed and/or position between these objects.

Disclosed embodiments can implement a simulation constraint solver. To run the simulation, the simulation objects are translated into primitives that can be solved by the simulation engine's constraint solver. There are a wide variety of systems for solving constraints.

A physics engine can be viewed as a kind of equation solver, where the equations formulate the laws of physics as applied to the variables determined by the simulation objects. Results are obtained by solving the equations at discrete time steps. The values of the variables can be viewed in many ways such as by tabulating a graph or by applying the values to graphical objects so that they appear to move.

The form for a physics engine equation is typically restricted. Some solvers provide more options than others, but generally, the equations are based on relationships of the velocities between pairs of bodies. A three-dimensional (3D) rigid body has six degrees of freedom; three linear and three rotary. When no constraint equations are applied, a body can move in all six degrees of freedom without restriction. Between a pair of rigid bodies, there are also six degrees of freedom, which measure the freedoms based on the relative positions of the two objects.

A constraint, like a rotary axis joint, imposes restrictions on the degrees of freedom so that certain motions are locked. A rotary axis joint, for example, imposes the loss of five degrees of freedom. All three linear freedoms are removed and only the single rotary degree of freedom around the rotary axis remains. To restrict five degrees of freedom like the rotary joint, one specifies five equations in the constraint. Various disclosed embodiments treat bodies as objects that are constrained, and treat joints as a kind of constraint that is independent of the coupling constraint.

The general form for a constraint equation (single constraint dimension) is $$A_1 \cdot v_1 + B_1 \cdot \omega_1 + A_2 \cdot v_2 + B_2 \cdot \omega_2 = c$$

where the symbols $v$ and $\omega$ represent the linear and angular velocity of a rigid body. Subscripts show from which rigid body the velocities come. The variables A, B, and c represent derived values for vectors A and B and correction value c, or can be specified by the individual implementing a physics library to define interactions between objects. The · represents the vector dot product. The implementer may also choose which two rigid bodies are being constrained. However, the structure of the equation and the number of bodies that can be used is normally fixed.

The A and B vectors can be viewed as the axes of motion for the respective rigid bodies and the c variable as the correction factor. For example, if one wished to constrain the linear movement of two bodies on the x-axis one would set $A_1$ to [1,0,0] and $A_2$ to [−1,0,0]. The B vectors are set to [0,0,0] and c is 0. The result would be an equation stating that the x linear velocity of body one equals the x linear velocity of body two. Note that this is a constraint on the velocities and not the positions of the bodies. Generally, if the bodies always move at the same speed, their positions will stay the same, too. If the bodies' positions fall out of alignment, though, one uses the c variable to add a small correction to the velocities so that one body can catch up to the other to be closer to the correct position for the next time step.

Disclosed embodiments can model coupling constraints. Implementing a coupling object using constraint equations in the standard form is hampered by the ability to only relate two rigid bodies at a time. Since a coupling will pair axis joint objects, and joints relate one or two rigid bodies, there can be two, three, or four rigid bodies associated with a single coupling.

FIGS. 4A-4E illustrate examples of some of the possible configurations of coupling constraints, joints, and rigid bodies. Not all configurations of rigid body, joint, and coupling need to be considered. For example, a joint whose attachment is empty does not do anything so it can effectively treated as non-existent; a coupling that uses that joint would likewise be void. In these figures, an M designates master, S designates slave, A designates attachment, and B designates base.

Figure 4A:
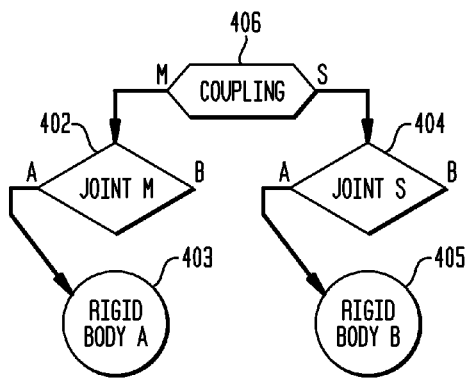
FIGS. 4A-4E illustrate examples of some of the possible configurations of coupling constraints joints and rigid bodies in accordance with disclosed embodiments.

The simplest coupling configuration is illustrated in FIG. 4A. In this case, rigid bodies are independent of one another and both joints 402 and 404, joined by coupling 406, are based in the background. Master joint 402 has an attachment 403 that can be referred to as a rigid body master attachment. Slave joint 404 has an attachment 405 that can be referred to as a rigid body slave attachment. The empty bases of the joints are important as this allows the velocity of the rigid body to be used directly. The axis velocity is normally the relative velocity between the attachment and base objects, but the background object velocity is always zero. Some simulation systems provide coupling implementations for this kind of configuration because it is straightforward to represent in a standard constraint equation.

Figure 4B:
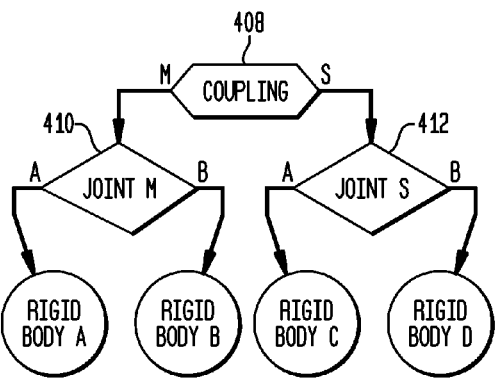

However, if one or more of the joint base objects are not empty, the simple, two rigid body constraint equation becomes imperfect. In FIG. 4B, a coupling 408 is tied between master joint 410 and slave joint 412 that each have two base objects. In this case, all four rigid bodies could make a contribution to the constraint and a more appropriate constraint equation would be as follows, as a general equation relating four rigid bodies in a coupling:

$$A_1 \cdot (v_a - v_b) + B_1 \cdot (\omega_a - \omega_b) + A_2 \cdot (v_a - v_d) + B_2 \cdot (\omega_a - \omega_d) = c$$

where the symbols v and ω again represent the linear and angular velocities of respective rigid bodies a, b, c, and d. In this modified equation, all four rigid bodies are accounted for with the velocity difference of each pair of bodies associated with each joint taking the place of a single rigid body's velocity. One could also break apart the axis vectors, $A_1$, $B_1$, $A_2$, and $B_2$, into separate axes for each rigid body's velocity. Implementing this kind of equation into the constraint solver would solve the problem, but is beyond the capabilities of current physics engines. Constraint equations with up to four rigid body references are not generally available in current physics engines.

Disclosed embodiments can address models where multiple coupled rigid bodies are modeled using pair-only constraint equations. To implement couplings using pair-only constraint equations, disclosed embodiments include specific techniques for selecting which bodies to constrain and execute a process suitable for solving the coupling for a wide variety of circumstances.

To select the constrained bodies, given the master and slave joints of the coupling, disclosed embodiments make determinations about the configuration of these objects and the rigid body objects the joints reference. The method selects one or two rigid bodies on which the coupling constraint will operate or decides that a coupling constraint is unable to run.

FIG. 5 illustrates a flowchart for an overall object selection and simulation process in accordance with disclosed embodiments; examples of various attachments and calculations are described below. Such a process can be performed by one or more data processing systems, referred to generically as "the system" below.

The system receives a simulation model (505). "Receiving," as used herein, can include loading from storage, receiving from another device or process, receiving via an interaction with a user, or otherwise. The simulation model can include a plurality of simulation objects, including at least one master joint coupled to at least one slave joint, each joint having an associated rigid body attachment; the attachment of the master joint is referred to as the master attachment and the attachment of the slave joint is referred to as the slave attachment. Each joint may also have an associated rigid body base.

In various embodiments, the master joint and slave joint are modeled as connected by a coupling. Each of the rigid bodies can have a linear velocity or an angular velocity.

The system identifies a master axis of the master attachment and a slave axis of the slave attachment based on the coupling (510). This action can include determining the type of axis of the master axis and the slave axis, such as whether each joint is a rotary joint, a linear joint, or a fixed joint.

The system determines if the coupling can be simulated (515), and can stop the process if it cannot. For example, the system may determine that the coupling cannot be simulated if the master attachment is NULL, if the slave attachment is NULL, if the master attachment and the slave attachment are the same, or if both the master axis and the slave axis have a motor.

The system makes a motor determination as to whether the master axis has a motor or whether the slave axis has a motor (520). In some cases, process 520 can be performed at the same time as process 515, and a motor determination that both the master axis and the slave axis have a motor can indicate that the coupling cannot be simulated.

The system makes a cross-base determination (525). The cross-base determination can include determining if the slave attachment is a base of the master joint and determining whether the master attachment is a base of the slave joint.

The system makes a constraint determination of which bodies to constrain based on the motor determination and the cross-base determination (530). In this case, when neither the master axis nor the slave axis has a motor, according to the motor determination, then the constraint determination can be that both the master attachment and the slave attachment are constrained.

When the master axis has a motor, and the slave axis does not have a motor, according to the motor determination, then if the slave attachment is a base of the master joint then the constraint determination can be that the slave attachment is constrained to the background and the master attachment is not constrained. Otherwise, if the master and slave do not share a rigid body, then the constraint determination can be that both the master attachment and the slave attachment are constrained.

When the slave axis has a motor, and the master axis does not have a motor, according to the motor determination, then if the master attachment is a base of the slave joint then the constraint determination can be that the master attachment is constrained to the background and the slave attachment is not constrained. Otherwise, if the master and slave do not share a rigid body, then the constraint determination can be that both the master attachment and the slave attachment are constrained.

The system stores constraints according to the constraint determination (535).

The system executes the simulation model based on the constraint determination (540). The simulation can be performed using the calculations described below, and can be based on the type of axis of the master axis and the slave axis.

According to various embodiments, only two rigid bodies are used for modeling at a time, using pair-only constraint equations, even when more than two rigid bodies are being modeled. To accomplish this, the selection process uses the directionality of joint objects to select the appropriate rigid bodies. The user or system is expected to create joints such that the pair of objects intended to be coupled are in the attachment property.

Figure 4C:
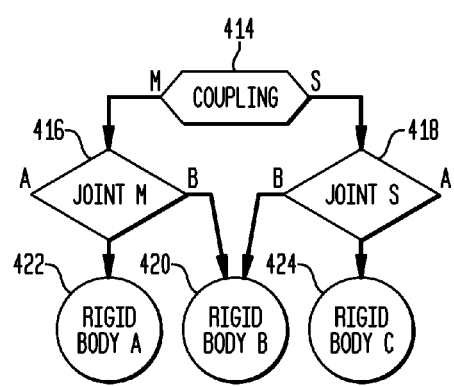

For example, in FIG. 4C, a coupling 414 is shown between two joints 416 and 418 that share a rigid body 420 for a base. In this case, the coupled pair of bodies is rigid body A 422 and rigid body C 424. This is important because other factors in the simulation may remove critical degrees of freedom.

Figure 6:
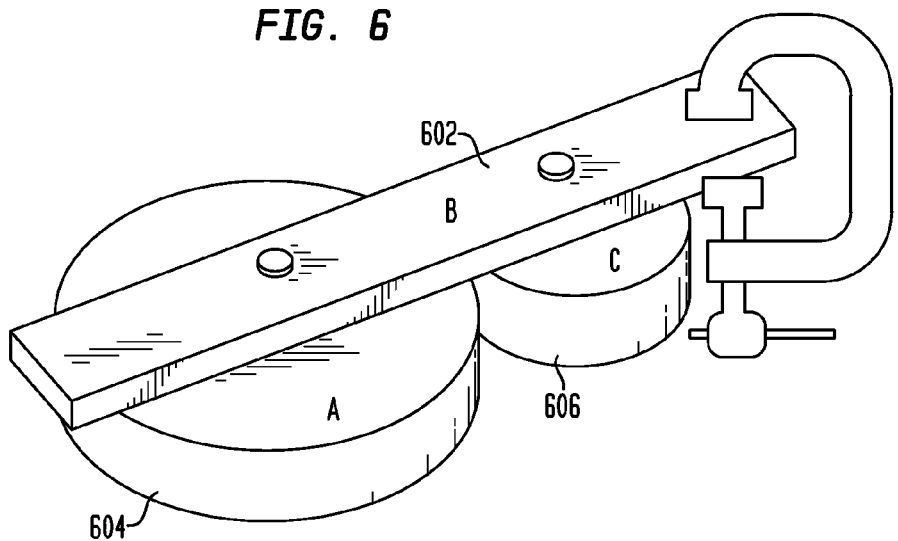
FIG. 6 illustrates an example of a coupling where the shared object is locked to background in accordance with disclosed embodiments.

FIG. 6 illustrates an example of a coupling where the shared object is locked to background, and can be represented by the objects in FIG. 4C. If body B 602 is clamped to the background, which may happen if a fixed joint were applied to body B 602, then one would expect the coupling constraint between bodies A 604 and C 606 to function normally. In this case, clamping body B 602 would be equivalent to the situation in FIG. 4A.

Figure 7:
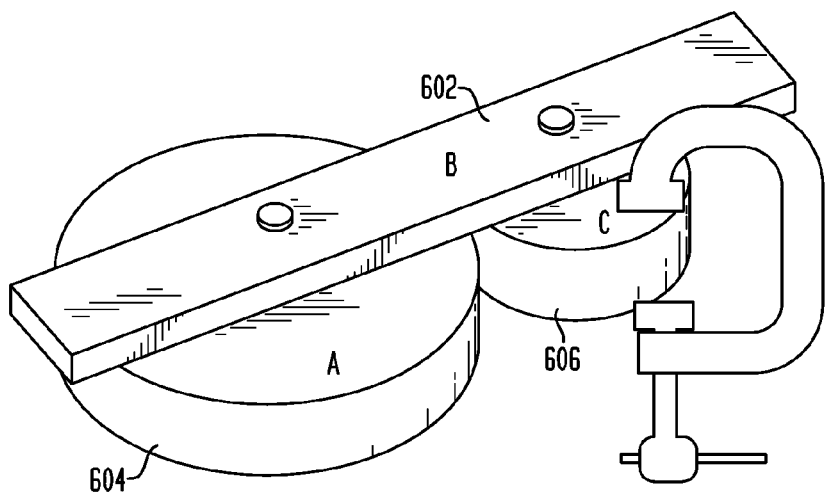
FIG. 7 illustrates an example of a coupling where an end object is clamped to background.

But it is also possible that the user might clamp body C 606 to the background. FIG. 7 illustrates an example of a coupling where an end object is clamped to background. In principle, bodies A 604 and B 602 would still be free to move and the gear should be allowed to function. However, a constraint between body A 604 and body C 606 would not function because C does not move. The user can remedy this situation by reversing the direction of joint S 418 in FIG. 4C so that the attachment is body B and the base is body C, as illustrated by the configuration of FIG. 4E. In that case, the coupling constraint is created between bodies A 604 and B 602 and clamping body C 606 to the background is fine.

Figure 4D:
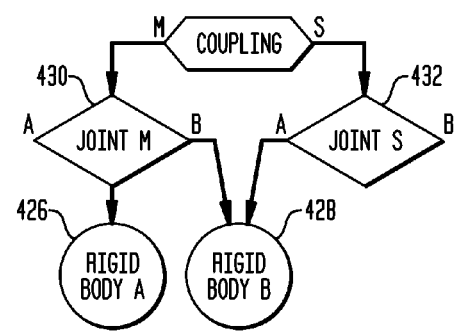
Figure 4E:
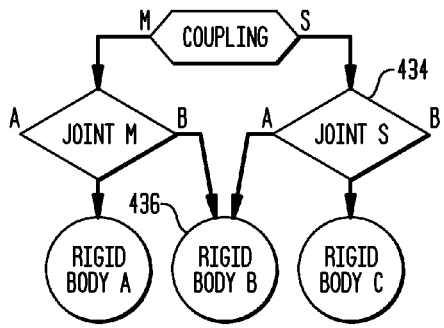

FIG. 4D illustrates an example of a situation such as for the sprocket and shuttle illustrated in FIG. 3. Note that this is similar to the case in FIG. 7 where the body C 606 is fixed to the background. In the shuttle and sprocket case, the fixed body is the linear bar and it is represented as background. Since there are just the two bodies, body A 426 can represent the sprocket and body B 428 can represent the shuttle. A constraint between these objects will not always suffice, however, because body B 428 shared between the two joints 430 and 432.

In shuttle and sprocket example of FIG. 3, for example, there is a motor on the rotary joint. A motor can be implemented as a constraint as many other simulation objects and the constraint would be between the same two bodies connected by the joint.

A motor on a joint acts effectively like a fixed joint. The motor's speed might be set to zero, for example, in which case it would be modeled exactly like a fixed joint, but even if the motor's speed is not zero, the motor's state completely determines the position of the two bodies. An additional constraint between these two objects such as the coupling would only over-constrain the system. The constraint between shuttle and sprocket cannot be both the motor and the gear. According to disclosed embodiments, the system can address this issue by simply ignoring one of the rigid bodies altogether in the coupling. Instead of creating the coupling as a constraint between body A 426 and body B 428, the constraint is made between body B 428 and the background object (nothing). This is effective since, if one of the axes is determined by a motor, then the other axis is also effectively motorized. The coupling constraint transfers the motion of the first motor into the positioning of the free axis. The user would only motorize one of the two axes in a coupling. Putting a motor on both axes would make the coupling irrelevant and the constraints overdetermined regardless.

Since body pair-wise constraint equations do not provide the capacity to solve for more than two bodies, disclosed embodiments exploit coupling and joint definitions, defined by the system or a user, that are arranged so that the two bodies being constrained will result in a working simulation. Though it may be possible to analyze the degrees of freedom provided by all joints and motors to select which two objects should be constrained by the coupling, it is generally impractical because the degrees of freedom can potentially change when objects move into different orientations and may be changed explicitly by programs within the simulation. For example, two bodies may start the simulation free to move independently, but later, they become glued together by a user action and act like a single rigid body.

In the process illustrated in FIG. 5, these different possibilities are captured. First, the attachment bodies of the master and slave joints are retrieved. If these bodies are either NULL or both master and slave use attachment on the same body, then the coupling is not valid. Given two rigid bodies, the method then looks at motor connections. It can be made possible to determine through back-pointers when a joint is being controlled using a motor. If both joints are controlled by motors, the coupling is not valid, but if there is a motor, special consideration takes place.

When there is a motor on a joint, a certain configuration of objects must be detected that is shown in FIGS. 4D and 4E; this is referred to above as a cross-base determination. Note that FIG. 4E looks similar to FIG. 4C but the direction of attachment and base on the slave joint B 434 is reversed. The attachment direction makes a difference. In the case of FIG. 4C, the attachment objects are still independent. They share a common base, but because of their connectivity, it is assumed that rigid body A 422 and rigid body B 420 move independently (such as the gears in FIG. 7).

The configurations in FIGS. 4D and 4E, however, are stacked together such that the movement of one body, the one at the base of the other, is expected to affect the motion of the other. The coupling is expected to occur between rigid bodies A and B. A motor connecting A and B would therefore not allow a coupling constraint between A and B to function. So instead, the coupling is made, in the example of FIG. 4E, between rigid body B 436 and the background. Disclosed embodiments use the background whether the base of the lower joint in the stack is set to another rigid body or not. The method works the same way for couplings where the slave joint has a motor and the slave's base is the same object as the master's attachment.

Various embodiments can use a coupling constraint equation as disclosed above:

$$A_1 \cdot v_1 + B_1 \cdot \omega_1 + A_2 \cdot v_2 + B_2 \cdot \omega_2 = c$$

where the symbols $v$ and $\omega$ represent the linear and angular velocity of a rigid body. Subscripts show from which rigid body the velocities come. The variables A, B, and c represent user-specified values.

Disclosed embodiments apply the constraint equation above to implement the coupling constraint. According to various embodiments, the A parameters are used to control linear joints and the B parameters to control angular joints. For example, in the example of FIG. 3, the master joint 312 is rotary and the slave joint 318 is linear so the method uses $B_1$ and $A_2$ to correlate the angular velocity of the master with the linear velocity of the slave leaving $A_1$ and $B_2$ to be zero vectors. However, this configuration ignores cases where joints are fixed by motors.

When axes are not the same type or are the same type but not aligned, then it becomes possible to compensate for the motion of one rigid body by the motion of the coupled body. In the example, the rotation of the gear 208 can cause the rod 204 to move linearly in FIG. 2, but it can also cause itself, the gear 208, to move linearly in the opposite direction. Less obviously, the green gear could stand still and the rod could both move linearly and rotate in the opposite direction that the gear would turn.

Figure 8:
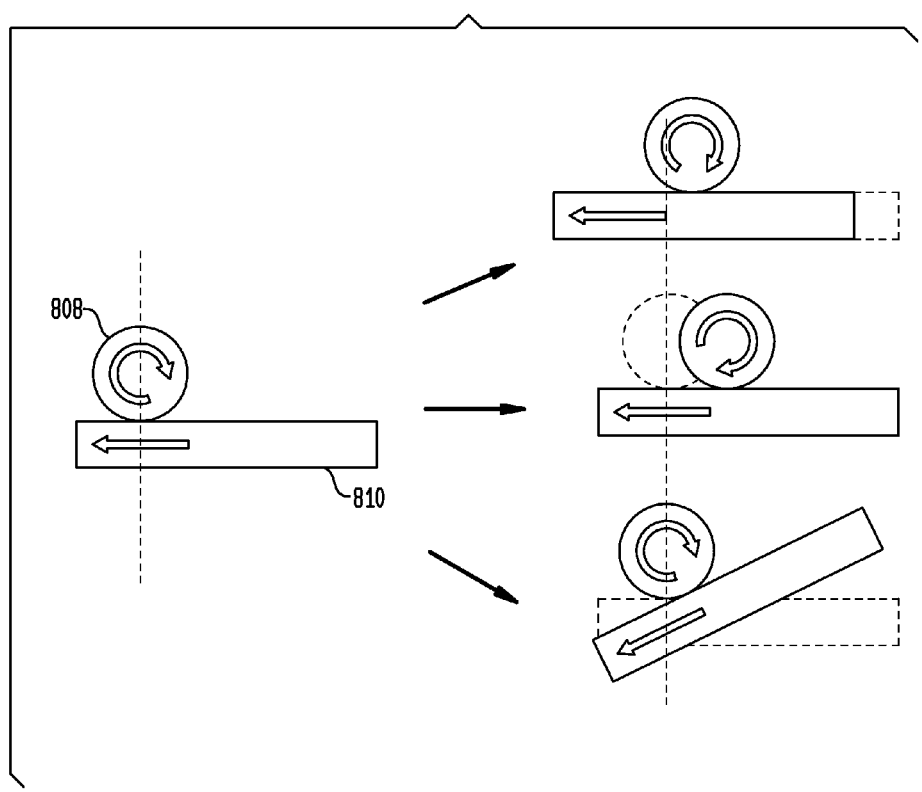
FIG. 8 illustrates different movement possibilities between a sprocket and a bar gear in accordance with disclosed embodiments.

FIG. 8 illustrates different movement possibilities between a sprocket 808 and a bar gear 810. This figure illustrates that the coupled motion of bodies can be compensated by each other's motion. In these example cases, the same amount of motion is applied to the coupled rotary and linear axes.

Instead of relying on the constrained objects being free to move independently, in disclosed embodiments, the potential movement of the opposite axis is encoded into the movement of each axis. Examples of the kinds of equations that result are described below.

For the mixed axis case, where one axis is rotary and the other is linear, the system can use:

$$A_1 \cdot v_1 + B_2 \cdot \omega_1 + A_1 \cdot v_2 + B_2 \cdot \omega_2 = c$$

In this case, the master axis is linear and moves in the direction of $A_1$ and the slave is rotary and rotates on the axis $B_2$. For the case where master is rotary and slave is linear, the index numbers are swapped. The length of the vector $A_1$ and $B_2$ are adjusted so that the ratio of their lengths corresponds to the inverse ratio of velocities applied to each axis. For example, if the rotary axis turns twice for every unit length traveled by the linear axis, the ratio of the length of $A_1$ divided by the length of $B_2$ would be $4\pi$.

When the coupling constraint uses the same kind of axis, either both are linear or both are rotary, the system can use the following equation to combine mixed axes:

$$(A_1 + A_2 - proj(A_2, A_1)) \cdot v_1 + (A_2 + A_1 - proj(A_1, A_2)) \cdot v_2 = c$$

where $$proj(A_1, A_2) = \frac{A_1 \cdot A_2}{A_2 \cdot A_1} A_2$$

In this example, the equation is setting up a linear-linear constraint. For a rotary-rotary constraint, the B vectors can be used on the angular velocity values, but the overall equation would be similar. Here, $A_1$ is the axis for the master and $A_2$ is the axis for the slave. Like the equation before, the lengths of the axes are set such that their ratio is the inverse of the ratios of the desired velocities. Note that when $A_1$ and $A_2$ are parallel, the projection of $A_2$ onto $A_1$ is just $A_2$ and the projection of $A_1$ onto $A_2$ is just $A_1$ so that the equation simplifies to the naïve equation, $A_1 \cdot v_1 + A_2 \cdot v_2 = c$ Using these equations, the system gives the constraint coupling the flexibility to move when the bodies are locked together with a motor. Otherwise, when the bodies are locked, there is no way for either body to move in the direction specified by the opposite axis. The joint becomes completely locked up. With the alternate direction built in, the body selection process illustrated in FIG. 5 allows the free body to be moved against the background in either direction allowed by the two axes. In this way, the free body's motion can compensate for the body that is locked down by a motor.

Since the base object velocities are being ignored in the multiple-axes equations above, the calculation is still only approximate. The correction amount, c, is used in the equations to compensate for the error induced when the base velocities are non-zero. This process works generally, but still has the disadvantage that the relationship between the velocities of all four objects in the coupling cannot be specified directly. The issue occurs when a base object's velocity becomes dependent on one or more of the attachments. In practice, this is rarely a problem since the base velocity is often set through a different set of constraints that is essentially fixed or is the non-moving background object.

Of course, those of skill in the art will recognize that, unless specifically indicated or required by the sequence of operations, certain steps in the processes described above may be omitted, performed concurrently or sequentially, or performed in a different order.

Disclosed embodiments provide for robust handling of coupling constraints in rigid body simulation. The standard techniques for implementing these constraints fail under circumstances that users commonly want to handle.

A body selection method as disclosed herein allows a pair of bodies to be used in a standard physics engine constraint equation. These bodies reflect semantics that can be understood by the user to provide the correct pair and prevent problems resulting from one or more of the bodies being locked to the background. Disclosed embodiments also provide a means to handle locking between bodies that is caused by a motor or similar kind of constraint between the coupled bodies.

The constraint equation as disclosed herein allows the movement of each body in the coupling to be reflected in the motion of the other body. Couplings with mixed type or couplings whose axes are not aligned can benefit from this method because it allows movement to be carried out even when the bodies are locked together with a motor.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for model simulation, the method performed by a data processing system and comprising:
receiving a simulation model in the data processing system, the simulation model including at least one master joint connected to at least one slave joint by a coupling, the master joint having a rigid body master attachment and the slave joint having a rigid body slave attachment;

identifying a master axis of the master attachment and a slave axis of the slave attachment based on the coupling, wherein the coupling defines the master joint and the slave joint;

making a motor determination as to whether the master axis has a motor or whether the slave axis has a motor;

making a cross-base determination corresponding to the master attachment and the slave attachment, including determining if the slave attachment is a base of the master joint or if the master attachment is a base of the slave joint;

making a constraint determination of which bodies to constrain based on the motor determination and the cross-base determination;

storing constraints according to the constraint determination; and executing the simulation model according to the constraint determination.

2. The method of claim 1, wherein the data processing system also determines if the coupling can be simulated by determining whether the master attachment is NULL, whether the slave attachment is NULL, whether the master attachment and the slave attachment are the same, or whether both the master axis and the slave axis have a motor.

3. The method of claim 1, wherein executing the simulation model is based on a type of axis of the master axis and a type of axis of the slave axis.

4. The method of claim 1, wherein when neither the master axis nor the slave axis has a motor, according to the motor determination, then the constraint determination is that both the master attachment and the slave attachment are constrained.

5. The method of claim 1, wherein when the master axis has a motor, and the slave axis does not have a motor, according to the motor determination, then when the slave attachment is a base of the master joint then the constraint determination is that the slave attachment is constrained to an unmoving background of the simulation and the master attachment is not constrained.

6. The method of claim 1, wherein the data processing system also determines a type of axis of the master axis and of the slave axis, and when the master axis and the slave axis are linear axes, then the system also stores a constraint of $$(A_1+A_2-\text{proj}(A_2,A_1))\cdot v_1+(A_2+A_1-\text{proj}(A_1,A_2))\cdot v_2=c$$

where $$\text{proj}(A_1, A_2) = \frac{A_1 \cdot A_2}{A_2 \cdot A_1} A_2,$$

$A_1$ is a vector representing the master axis, $A_2$ is a vector representing the slave axis, $v_1$ represents the linear velocity of the master attachment, $v_2$ represents the linear velocity of the slave attachment, and c represents a correction factor.

7. A data processing system, comprising:
a processor; and
an accessible memory, the data processing system particularly configured to
receive a simulation model including at least one master joint connected to at least one slave joint by a coupling, the master joint having a rigid body master attachment and the slave joint having a rigid body slave attachment;

identify a master axis of the master attachment and a slave axis of the slave attachment based on the coupling;

make a motor determination as to whether the master axis has a motor or whether the slave axis has a motor;

make a cross-base determination corresponding to the master attachment and the slave attachment, including determining if the slave attachment is a base of the master joint or if the master attachment is a base of the slave joint;

make a constraint determination of which bodies to constrain based on the motor determination and the cross-base determination;

store constraints according to the constraint determination; and execute the simulation model according to the constraint determination.

8. The data processing system of claim 7, wherein the data processing system also determines if the coupling can be simulated by determining whether the master attachment is NULL, whether the slave attachment is NULL, whether the master attachment and the slave attachment are the same, or whether both the master axis and the slave axis have a motor.

9. The data processing system of claim 7, wherein executing the simulation model is based on a type of axis of the master axis and a type of axis of the slave axis.

10. The data processing system of claim 7, wherein when neither the master axis nor the slave axis has a motor, according to the motor determination, then the constraint determination is that both the master attachment and the slave attachment are constrained.

11. The data processing system of claim 7, wherein when the master axis has a motor, and the slave axis does not have a motor, according to the motor determination, then when the slave attachment is a base of the master joint then the constraint determination is that the slave attachment is constrained to an unmoving background of the simulation and the master attachment is not constrained.

12. The data processing system of claim 7, wherein the data processing system also determines a type of axis of the master axis and of the slave axis, and when the master axis and the slave axis are linear axes, then the system also stores a constraint of $$(A_1+A_2-\text{proj}(A_2,A_1))\cdot v_1+(A_2+A_1-\text{proj}(A_1,A_2))\cdot v_2=c$$

where $$\text{proj}(A_1, A_2) = \frac{A_1 \cdot A_2}{A_2 \cdot A_1} A_2,$$

$A_1$ is a vector representing the master axis, $A_2$ is a vector representing the slave axis, $v_1$ represents the linear velocity of the master attachment, $v_2$ represents the linear velocity of the slave attachment, and c represents a correction factor.

13. A non-transitory machine-readable medium encoded with executable instructions that, when executed, cause a data processing system to:
receive a simulation model including at least one master joint connected to at least one slave joint by a coupling, the master joint having a rigid body master attachment and the slave joint having a rigid body slave attachment;

identify a master axis of the master attachment and a slave axis of the slave attachment based on the coupling;

make a motor determination as to whether the master axis has a motor or whether the slave axis has a motor;

make a cross-base determination corresponding to the master attachment and the slave attachment, including determining if the slave attachment is a base of the master joint or if the master attachment is a base of the slave joint;

make a constraint determination of which bodies to constrain based on the motor determination and the cross-base determination;

store constraints according to the constraint determination; and execute the simulation model according to the constraint determination.

14. The machine-readable medium of claim 13, wherein the data processing system also determines if the coupling can be simulated by determining whether the master attachment is NULL, whether the slave attachment is NULL, whether the master attachment and the slave attachment are the same, or whether both the master axis and the slave axis have a motor.

15. The machine-readable medium of claim 13, wherein executing the simulation model is based on a type of axis of the master axis and a type of axis of the slave axis.

16. The machine-readable medium of claim 13, wherein when neither the master axis nor the slave axis has a motor, according to the motor determination, then the constraint determination is that both the master attachment and the slave attachment are constrained, and wherein when the master axis has a motor, and the slave axis does not have a motor, according to the motor determination, then when the slave attachment is a base of the master joint then the constraint determination is that the slave attachment is constrained to an unmoving background of the simulation and the master attachment is not constrained.

17. The machine-readable medium of claim 13, wherein the data processing system also determines a type of axis of the master axis and of the slave axis, and when the master axis and the slave axis are linear axes, then the system also stores a constraint of $$(A_1+A_2-\text{proj}(A_2,A_1))\cdot v_1+(A_2+A_1-\text{proj}(A_1,A_2))\cdot v_2=c$$

where $$\text{proj}(A_1, A_2) = \frac{A_1 \cdot A_2}{A_2 \cdot A_1} A_2,$$

A1 is a vector representing the master axis, A2 is a vector representing the slave axis, v1 represents the linear velocity of the master attachment, v2 represents the linear velocity of the slave attachment, and c represents a correction factor.

* * * * *